(12) United States Patent
Roberts

(10) Patent No.: US 12,480,054 B2
(45) Date of Patent: *Nov. 25, 2025

(54) WETTING COMPOSITION

(71) Applicant: ADVANCED WETTING TECHNOLOGIES PTY LTD, New South Wales (AU)

(72) Inventor: Raymond John Roberts, Prahran (AU)

(73) Assignee: Advanced Wetting Technologies Pty Ltd, New South Wales (AU)

( * ) Notice: Subject to any disclaimer, the term of this patent is extended or adjusted under 35 U.S.C. 154(b) by 998 days.

This patent is subject to a terminal disclaimer.

(21) Appl. No.: 17/053,010

(22) PCT Filed: Jul. 17, 2018

(86) PCT No.: PCT/AU2018/050750
§ 371 (c)(1),
(2) Date: Nov. 4, 2020

(87) PCT Pub. No.: WO2019/213688
PCT Pub. Date: Nov. 14, 2019

(65) Prior Publication Data
US 2021/0370253 A1 Dec. 2, 2021

(30) Foreign Application Priority Data
May 7, 2018 (AU) .............................. 2018901549

(51) Int. Cl.
| C09K 23/38 | (2022.01) |
| A01N 25/14 | (2006.01) |
| A01N 25/30 | (2006.01) |
| C09K 23/00 | (2022.01) |
| C09K 23/42 | (2022.01) |
| C11D 1/722 | (2006.01) |
| C11D 3/20 | (2006.01) |
| C11D 3/43 | (2006.01) |

(52) U.S. Cl.
CPC .............. *C09K 23/38* (2022.01); *A01N 25/14* (2013.01); *A01N 25/30* (2013.01); *C09K 23/00* (2022.01); *C09K 23/42* (2022.01); *C11D 1/722* (2013.01); *C11D 3/2013* (2013.01); *C11D 3/43* (2013.01)

(58) Field of Classification Search
CPC .......... C09K 23/017–018; C09K 23/38; C11D 3/2006–202
See application file for complete search history.

(56) References Cited

U.S. PATENT DOCUMENTS

| 2,221,933 | A | 11/1940 | Eitelman et al. |
| 3,900,307 | A | 8/1975 | Abramitis |
| 4,069,244 | A | 1/1978 | Mueller |
| 4,098,694 | A | 7/1978 | Perlaky |
| 4,141,871 | A | 2/1979 | Shimp et al. |
| 4,396,738 | A | 8/1983 | Powell et al. |
| 4,491,534 | A | 1/1985 | Vanlerberghe et al. |
| 5,273,684 | A | 12/1993 | Traber et al. |
| 5,300,154 | A | 4/1994 | Ferber et al. |
| 5,385,750 | A | 1/1995 | Aleksejczyk et al. |
| 5,620,788 | A | 4/1997 | Garavaglia et al. |
| 5,856,287 | A * | 1/1999 | Motyka .................. C11D 3/201 510/342 |
| 6,150,320 | A | 11/2000 | McDonell et al. |
| 6,652,766 | B1 | 11/2003 | Frankenbach |
| 7,560,494 | B2 | 7/2009 | Steinbrenner et al. |
| 10,111,420 | B2 | 10/2018 | Roberts |
| 2003/0021759 | A1* | 1/2003 | Milbradt ................ C11D 3/202 424/70.28 |
| 2004/0234563 | A1* | 11/2004 | Bruening ............... A61Q 15/00 424/401 |
| 2005/0049167 | A1 | 3/2005 | Noerenberg et al. |
| 2010/0234227 | A1* | 9/2010 | Maier .................... A01N 25/04 504/270 |
| 2010/0234232 | A1 | 9/2010 | Dairiki et al. |
| 2014/0045693 | A1* | 2/2014 | Roberts ................. A01N 25/30 504/358 |

FOREIGN PATENT DOCUMENTS

| AU | 2008249536 A1 | 6/2009 |
| CH | 344079 A | 1/1960 |
| CN | 1335125 A | 2/2002 |
| CN | 103501887 A | 1/2014 |
| CN | 104059058 A | 9/2014 |

(Continued)

OTHER PUBLICATIONS

Lial 123 Alcohol Information. Sasol. https://products.sasol.com/pic/products/home/grades/EU/5lial-123-alcohol/index.html. As viewed on Dec. 13, 2023. (Year: 2023).*
Begum, F. Surfactants. Kirk-Othmer Encyclopedia of Chemical Technology. John Wiley & Sons, Inc. 2020. (Year: 2020) (Year: 2020).*
International Search Report and Written Opinion corresponding to International Patent Application No. PCT/AU2018/050750, mailed Oct. 18, 2018.
Roberts, Raymond J. 'Solving the problem of chipout in laminated particleboard and improving the performance of high speed blenders'. Abstract of Presentation During the International Wood Composites Symposium 2011, Apr. 2011. RJRoberts Consulting Pty. Ltd.
Roberts, Raymond J. 'Blending Efficiency Part A: Solving the Problem of Chipout in Laminated Particleboard'. Abstract. Presented During the International Wood Composites Symposium, 2011.

(Continued)

*Primary Examiner* — Stephen E Rieth
(74) *Attorney, Agent, or Firm* — Lathrop GPM LLP; Brian C. Trinque

(57) ABSTRACT

The invention relates to a wetting composition comprising (a) from 20 to less than 50 wt % of one or more C10 to C14 alcohol, (b) 25 to 70 wt % of a surfactant selected from a non-ionic, cationic, anionic and amphoteric surfactant, and (c) from 5 to 50 wt % of a polar component comprising at least one selected from (i) water, and (ii) up to 25 wt % of a water-miscible C1-C3 organic solvent, to methods for using the wetting composition, and products and aqueous compositions containing the wetting composition.

14 Claims, 3 Drawing Sheets

(56) References Cited

FOREIGN PATENT DOCUMENTS

| CN | 102414090 | B  | 10/2014 |
| CN | 107646840 | A  | 2/2018  |
| CN | 105602537 | B  | 4/2019  |
| DE | 19956236  | A1 | 5/2001  |
| DE | 19956237  | A1 | 5/2001  |
| DE | 102004053968 | A1 | 5/2006 |
| FR | 2495500   | A1 | 6/1982  |
| JP | H0952810  | A  | 2/1997  |
| NZ | 556299    | A  | 6/2009  |
| WO | WO9207058 | A1 | 4/1992  |
| WO | 2006127937 | A2 | 11/2006 |
| WO | WO2015147024 | A1 | 10/2015 |

OTHER PUBLICATIONS

Roberts, Raymond J. 'Blending Efficiency Part B: Core Blending and How to Improve it'. Presented During the International Wood Composites Symposium, 2011.

Lin et al., Adsorption Kinetics of 1-Octanol Air-Water Interface, (Langmuir 1997, 13(23) 6211-6218) (Year: 1997).

International Search Report and Written Opinion corresponding to International Patent Application No. PCT/AU2012/000335, mailed Jun. 7, 2012.

* cited by examiner

WETTING COMPOSITION

RELATED APPLICATIONS

This application is a 35 U.S.C. § 371 filing of International Application No. PCT/AU2018/050750, filed Jul. 17, 2018, which application claims priority to Australian Patent Application No. 2018901549, filed May 7, 2018. Both of these applications are incorporated by reference in their entireties.

FIELD OF THE INVENTION

The present invention relates to the wetting of low energy surfaces. In particular, the invention relates to wetting compositions that can lower the surface tension of an aqueous liquid composition. The invention also relates to aqueous liquid compositions of lowered surface tension and to methods for improving the aqueous wettability of a low energy surface through the use of aqueous compositions containing the wetting composition.

BACKGROUND

Surface tension is a property of a liquid in contact with a gas, such as air. The surface tension of a liquid is governed by the tendency of molecules in the liquid to be attracted to one another and reflects the strength of the intermolecular cohesive interactions between liquid molecules. In high surface tension liquids, cohesive forces promoting intermolecular interactions between molecules in the liquid are stronger than adhesive forces promoting interaction of the liquid molecules with air. More work is required to disrupt cohesive intermolecular interactions and to increase the surface area of high surface tension liquid, compared to a liquid of low surface tension.

Wetting is a phenomenon determined by the interaction of a liquid with a substrate (either a solid or another liquid) and subsequent spreading of the liquid on the substrate. The capacity of a liquid to wet reflects the ability of the liquid to spread on a particular surface without any driving forces, such as where capillary forces influence the spreading of the liquid due to surface morphology issues (e.g. very small scratches) on the surface of the surface to be wet. However even capillary forces are governed by the surface tension of a liquid.

The ability of a liquid to wet the surface of a solid substrate is measured by the interfacial energy between the liquid and the solid. Interfacial energy is defined by the difference between the surface tension of the liquid and the surface energy of the solid. The smaller this value the greater will be the ability of the liquid to spread on the solid. If the surface tension of the liquid is high and the surface energy of the solid is low then the interfacial energy between the two is large and hence wetting will not take place. In such circumstances, the liquid will be described as being non-wetting for the substrate. However, if the surface tension of the liquid is lowered and/or the surface energy of the solid is increased then the interfacial energy between the two will be reduced, thereby allowing wetting to occur.

Water has a surface tension of about 72 mN/m at 20° C. Surfaces that have a low energy are not readily wet by aqueous liquids including water due to the relatively high surface tension of the liquid, resulting in a large interfacial energy. Such low energy surfaces can therefore be said to be hydrophobic. The poor aqueous wettability of the low energy surface can pose a problem when the aqueous liquid is desirably spread on the surface for some reason.

In nature, most manufacturing processes and in agriculture, it is very difficult to increase the surface energy of a solid. As a result, it is almost always necessary to decrease the surface tension of the liquid in order to enhance the spreading of the liquid on the solid.

By way of example, in the agricultural industry, agricultural compositions are applied to flora to deliver an active compound, such as a liquid or particulate herbicide, fungicide, pesticide or fertiliser. Typically, the active compound is delivered in an aqueous liquid system as a foliar spray. However, the components of a plant such as the leaves, shoots and stalks, are inherently hydrophobic which means the wettability of the target surfaces by the foliar spray must be controlled in order to ensure the active compound reaches and coats the surfaces and does not just run off to top-soil, rendering the application less than fully effective.

Furthermore, it is desirable for dyes such as inks to spread onto paper or textiles and the like. When dyeing textiles made of synthetic fibres such as nylon and polyester it is preferred to thoroughly wet the surfaces of the fibres in order to give an even coverage by the dye on the fibre. The wetting ability of the dye bath is particularly important when dyeing synthetic fibres which have been treated with a fluoro acrylate resin which renders the surface inherently hydrophobic.

In addition, the wetting of particles by aqueous liquids poses problems when the particles are inherently hydrophobic and/or when the void spaces between the particles prevents penetration of the liquid into the substrate. For instance, in the laminated particle board industry individual wood particle flakes are coated with an aqueous-based resin, which can cure and harden upon exposure to appropriate conditions, thereby enabling the resin to function as glue for the particles. However, as dry particle flake has a very low surface free energy i.e. is a poorly wetting surface and as the resin mix has a relatively high surface tension, the interfacial energy between the two is high. This impedes the transfer and spread of the resin on the flake surface. If large flake is not effectively resinated, it could produce zones of weakness that will impact on the integrity of the resultant panel formed from the wood particle flakes.

The contact angle ($\Theta$) is commonly used to quantify the wetting of a substrate. The contact angle is the tangent that the liquid (L)/vapour (V) interface makes with the solid (S) surface at the three phase contact line. The contact angle is determined by the properties of the liquid and the solid surface, and the interaction and balance of intermolecular forces (i.e. cohesive and adhesive forces) between them. When a liquid drop is placed on a surface, the liquid contact angle will be in the range of 0° to 180°. A contact angle of 0° indicates perfect wetting and the liquid forms a thin film over the surface of the substrate. In comparison, a contact angle of greater than 90° indicates a non-wetting situation, while partial wetting occurs when a contact angle of $0°<\Theta<90°$ is observed. Contact angle is therefore a measurement of the process of wetting a particular solid with a particular liquid. However irrespective of the surface energy of the solid, if one can reduce the surface tension of a liquid then the liquid will spread more effectively.

Improvements in the wetting of a solid by a liquid can be achieved by the addition of a surfactant to the liquid. Many different classes of surfactant exist and are widely used in a range of different industries. Generally, surfactants are amphiphilic compounds having a hydrophilic head group and a hydrophobic tail. Surfactants can migrate to the three-phase interface of liquid, surface and air, and adsorb at the interface to improve wettability and liquid spreading. However, the adsorption of surfactants at the interface reduces the concentration of surfactant in the bulk liquid, thereby increasing the surface tension of the liquid and slowing wetting until more surfactant molecules migrate to the three-phase interface. This is known as the stick/slip phenomenon. The slip/stick phenomenon, in conjunction with the formation of micelles in the liquid once surfactant concentration reaches the critical micelle concentration (CMC), limits the wetting performance of many surfactants. These micelles must break down to maintain the concentration of surfactant that is available to migrate to, and be effective at, the three-phase interface.

Organosilicones are a powerful class of surfactant used in drug and personal care products as well as agrochemical compositions. One example of a commercially available organosilicone surfactant is Silwet L-77™, which is a trisiloxane ethoxylate. Other commercial organosilicone surfactants include Silwet 408™ and Silwet HS312™ Organosilicone surfactants have been reported to exhibit a surface tension of 20-26 mN/m (Kovalchuk et al, Advances in Colloid and Interface Science, Volume 210, August 2014, pages 65-71), and the excellent spreading ability of the surfactants thought to be due to the compact siloxane backbone of the hydrophobic tail group. However, while organosilicone surfactants are effective, it is thought that these compounds can act as endocrine disruptors for insect populations, including bees. Furthermore, while the ethoxylate portion of the organosilicone can readily biodegrade, the siloxane portion will slowly hydrolyse over time at a rate of between 2-8% per annum, depending on environmental moisture and temperature. As a result, the overall biodegradability of these surfactants is considered low. Breakdown products from organosilicone surfactants can also render soils hydrophobic, which is undesirable for agricultural applications.

Fluorosurfactants are another class of highly effective surfactants, which are synthetic compounds having a hydrophilic head group and a hydrophobic fluorocarbon tail. These surfactants can generate aqueous liquids having a minimum surface tension of from 15 to 20 mN/m, which can be used in paints and coatings, adhesives, cleaning agents, anti-fogging and anti-static agents, and fire-fighting foams. However, a drawback of fluorosurfactants is that they can create highly toxic breakdown products, which can persist in the environment and be bioaccumulative. For instance, it has been found that ground water at some firefighting training sites can remain contaminated with fluorosurfactant more than a decade after the site was last used.

International patent application number PCT/AU2012/000335 describes a wetting composition containing equal to or greater than 50 wt % of an insoluble C5 to C12 alcohol in combination with a surfactant, which is formulated for addition to an aqueous liquid to improve the ability of the aqueous liquid to wet a low energy surface. However, an issue with some of these compositions is they can be strongly odorous, which can limit the practical usability of the compositions in some applications.

It remains desirable to develop alternative compositions and methods that can improve the aqueous wettability of low energy hydrophobic surfaces.

SUMMARY OF THE INVENTION

The present invention relates to wetting compositions that are intended for addition to an aqueous liquid that desirably wets a low energy surface.

In one aspect, the present invention provides a wetting composition comprising:
(a) from 20 to less than 50 wt % of one or more C10-C14 alcohol;
(b) 25 to 70 wt % of one or more surfactant selected from a non-ionic, cationic, anionic and amphoteric surfactant; and
(c) 5 to 50 wt % of a polar component comprising at least one selected from (i) water and (ii) up to 25 wt % of a water-miscible C1-C3 organic solvent.

In another aspect of the invention there is provided an aqueous liquid composition comprising a wetting composition as described herein and an aqueous liquid.

In another aspect of the invention there is provided a method of lowering the surface tension of an aqueous liquid, the method comprising the step of adding a wetting composition as described herein to the aqueous liquid.

There is also provided a method of wetting a low energy surface with a relatively high surface energy liquid, the method comprising the step of:
adding a wetting composition as described herein to the liquid; and
contacting the low energy surface with the liquid comprising the wetting composition.

BRIEF DESCRIPTION OF THE FIGURES

Embodiments of the invention will now be described with reference to the following Figures, which are intended to be exemplary only, and in which.

DETAILED DESCRIPTION

Figure 1:
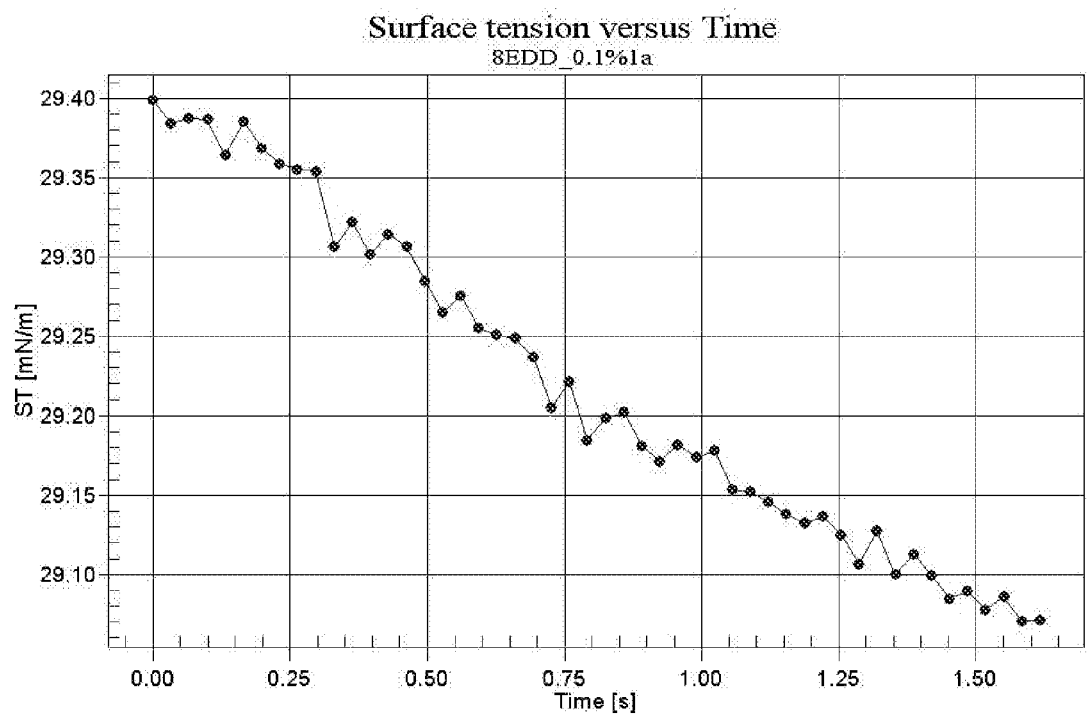
FIG. 1 is graph illustrating the change in surface tension (mN/m) over time (s) for an aqueous liquid comprising 0.1% of a wetting composition comprising 50% non-ionic surfactant, 25% dodecanol and 25% 2-butoxyethanol of one embodiment of the invention.

As used herein, the singular forms "a," "an," and "the" designate both the singular and the plural, unless expressly stated to designate the singular only.

The term "about" and the use of ranges in general, whether or not qualified by the term about, means that the number comprehended is not limited to the exact number set forth herein, and is intended to refer to ranges substantially within the quoted range while not departing from the scope of the invention. As used herein, "about" will be understood by persons of ordinary skill in the art and will vary to some extent on the context in which it is used. If there are uses of the term which are not clear to persons of ordinary skill in the art given the context in which it is used, "about" will mean up to plus or minus 10% of the particular term.

Percentages (%) referred to herein are based on weight percent (i.e. wt %, w/w or w/v) unless otherwise indicated.

Wetting compositions described herein are intended for addition to aqueous liquids that desirably wets a low energy surface. The wetting composition comprises a surfactant in combination with a long chain alcohol and at least one polar component. The wetting composition is added to an aqueous liquid to reduce the surface tension of the aqueous liquid.

In one aspect, the present invention provides a wetting composition comprising:
  (a) from 20 to less than 50 wt % of one or more C10-C14 alcohol;
  (b) 25 to 70 wt % of one or more surfactant selected from a non-ionic, cationic, anionic and amphoteric surfactant; and
  (c) 5 to 50 wt % of a polar component comprising at least one selected from (i) water and (ii) up to 25 wt % of a water-miscible C1-C3 organic solvent.

The wetting composition comprises at least one C10-C14 alcohol as a component of the composition. The at least one C10-C14 alcohol is present in the wetting composition in an amount of equal to or greater than 20% to less than 50% by weight. The wetting composition can contain a single C10-C14 alcohol. Alternatively, there can be more than one C10-C14 alcohol such that the wetting composition can contain a mixture of two or more C10-C14 alcohols. The C10-C14 alcohol or mixture of C10-C14 alcohols can be regarded as the alcohol component of the wetting composition.

The C10-C14 alcohols are generally insoluble or sparingly soluble in water due to the large number of carbon atoms present in the molecules. By "water insoluble" it is meant that the alcohol does not dissolve in water even with encouragement by heat and/or agitation. The C10-C14 alcohols may have a solubility in water that is equal to or less than 10 mg/L at 20° C.

The C10-C14 alcohols are aliphatic alcohols, and may be primary, secondary or tertiary alcohols having a linear or branched hydrocarbon structure composed of from 10 to 14 carbon atoms. Thus the alcohols can have a chain length of C10 up to and including C14.

The use of a C10-C14 alcohol in the wetting composition is important as such alcohols are thought to advantageously influence the ability of the surfactant in the wetting composition to assemble at the liquid/vapour interface, as explained further below.

In one embodiment, the wetting composition comprises a mixture of two or more C10-C14 alcohols. For example, a wetting composition of an embodiment of the invention can comprise a mixture of a C12 alcohol and a C14 alcohol. In such embodiments, the total quantity of C10-C14 alcohol in the alcohol component of the wetting composition remains in the range is from 20 to less than 50% by weight.

In one form, the wetting composition comprises at least one C10-C14 straight chain aliphatic alcohol. However, there can be more than one straight chain aliphatic C10-C14 alcohol in the wetting composition.

Advantageously, C10-C14 alcohols are less odorous than other long chain aliphatic alcohols such as 1-octanol (C8 alcohol). Consequently, in some embodiments, wetting compositions comprising C10-C14 alcohols do not require additives such as fragrances to mask the odour of the composition.

In one embodiment, the wetting composition comprises a C10, C12 or C14 straight chain aliphatic alcohol, or a mixture of such alcohols. Exemplary straight chain aliphatic C10, C12 and C14 alcohols can be 1-decanol, 1-dodecanol and 1-tetradecanol.

In one form, the wetting composition comprises a C12 alcohol, either alone or in combination with a C10 alcohol or a C14 alcohol.

When the wetting composition comprises a C12 alcohol in admixture with a C10 alcohol or C14 alcohol, the relative proportion of C12 alcohol to C10 alcohol or C14 alcohol in the mixture of alcohols can be in the range of from 50:50 to 90:10.

A skilled person would appreciate that the relative proportion of C12 and either C10 or C14 alcohol is a based on the relative quantity of each component by weight. That is, at a relative proportion of 50:50, the composition will comprise a C12 alcohol and either a C10 or C14 alcohol in equal amounts by weight. The relative proportion can thus also reflect the weight ratio of alcohol compounds in the mixture.

In one embodiment, the wetting composition comprises a C12 alcohol in combination with a C10 alcohol. In such embodiments, the relative proportion of C12 alcohol to C10 alcohol can be in the range of from 50:50 to 80:20 by weight.

In another embodiment, the wetting composition comprises a C12 alcohol in combination with a C14 alcohol. In such embodiments, the relative proportion of C12 alcohol to C14 alcohol can be in the range of from 56:44 to 87:13 by weight. In one preference, the relative proportion of C12 alcohol to C14 alcohol is about 70:30 by weight.

As the C12 alcohol can be present in a larger quantity than the C10 or C14 alcohol, it can form the main component of the alcohol component (i.e. component (a)) of the wetting composition.

In one embodiment, the wetting composition comprises a mixture of 1-dodecanol in combination with 1-decanol or 1-tetradecanol. The relative proportion of 1-dodecanol to either 1-decanol or 1-tetradecanol in the composition can be in the ranges described above.

In one particular embodiment, the wetting composition comprises a mixture of 1-dodecanol and 1-tetradecanol. The relative proportion of 1-dodecanol to 1-tetradecanol in the mixture of alcohols can be in range of from 50:50 to 90:10 by weight. For example, the relative proportion of 1-dodecanol to 1-tetradecanol can be selected from 50:50, 56:44, 60:40, 70:30, 80:20, 87:13, 85:15 or 90:10 by weight.

The wetting composition can comprise a suitable amount of C10-C14 alcohol. The total amount of C10-C14 alcohol is balanced with the remaining components of the composition, which are also present in defined proportions.

In some embodiments, the total amount of C10-C14 alcohol in the wetting composition is at least 20% of the composition, and can be at least 21%, at least 22%, at least 23%, at least 24%, or at least 25% of the composition. The total amount of C10-C14 alcohol can be up to 49%, up to 48%, up to 47%, up to 45%, up to 35%, up to 30%, or up to 28%, by weight of the composition. The total amount of C10-C14 alcohol can be in any concentration within any of these upper and lower limits, for example, between 22 to 47%, or 25 to 45% by weight.

In some embodiments, the wetting composition can comprise one or more C10-C14 alcohols in a total amount of about 20, 22.5, 25, 30, 35, 40, or 45 wt %.

The wetting composition of the present invention also comprises a surfactant. The surfactant component constitutes from 25 to 70% by weight of the wetting composition and comprises at least one surfactant selected from a non-ionic, cationic, anionic and amphoteric surfactant. The surfactant component of the wetting composition can comprise a mixture of two or more of the afore-mentioned surfactants. Where there is a mixture of surfactants, the total quantity of surfactant in the wetting composition is in the range of from 25 to 70%.

It is a requirement that the surfactant component of the wetting composition does not comprise an organosilicone surfactant or fluorosurfactant.

Surfactants for the wetting composition are amphiphilic compounds and can be selected from those that can lower the surface tension of an aqueous liquid, including water. The surfactant should be at least partially and preferably totally soluble in the target aqueous liquid. By "at least partially soluble" it is meant that at least about 50, 65, 75, 80, 90 or 95% of an amount of the surfactant is capable of dissolving in the aqueous liquid. The skilled person will readily be able to determine the solubility of a chosen surfactant in an aqueous liquid.

The surfactant should not undergo chemical reactions with the C10-C14 alcohol or other additives in the wetting composition. Furthermore, the surfactant should be chosen not to undergo chemical reactions with the aqueous liquid to which it will be added or with any components of the aqueous liquid to which it will be added. There should be no chemical reactions even upon the application heat. By "not undergo chemical reaction" or "no chemical reactions" it is meant that there are no reactions that form new chemical products. There may be hydrogen bonding or other reversible chemical interactions between the chemicals. The surfactant should not chemically react with the low energy surface or adhesion problems will result. Preferably, the surfactant does not form hydrogen or other bonds with the low energy surface.

The surfactant is advantageously chosen to be non-toxic and non-flammable. The surfactant should not adversely affect the characteristics of the aqueous liquid to which it will be added, other than to reduce or assist in reducing its surface tension. It is advantageous if the surfactant does not change the aqueous liquid characteristics including colour, viscosity and odour.

In one embodiment, the surfactant may be biocompatible, biodegradable and non-toxic. This can be advantageous for a wetting composition intended for use in agricultural compositions, where environmental compatibility and non-toxicity to fish and other organisms present in natural waterways is desired. For other applications where biocompatibility is desirable, such as cosmetic or neutraceutical/pharmaceutical compositions intended for application to the hair, skin or nails, the surfactant should be selected to be non-allergenic and should not irritate the skin.

In another embodiment, the surfactant may be one selected to keep a complex aqueous liquid, such as an aqueous-based resin, in a dispersed phase. This is especially important when using pigment particles such as titanium dioxide in resins. When the resin is used to coat a wood particle flake used, for example, in the formation of particle board, the surfactant selected should be one which is heat resistant during the temperatures to which the board will be exposed during the curing process and should not affect the ability of the resin to cure and thereby harden. If the surfactant is not heat resistant, any break down of the surfactant at high temperature should result in non-toxic by-products that are not deleterious to the surrounding environment. When the resin is for coating paper, the surfactant should be UV stable if it is important that the paper is not discoloured by any by-products of breakdown of the surfactant molecule.

In another embodiment, the surfactant may be one selected to keep powdered herbicides, pesticides or fertilisers, or other powdered formulations containing other agents in a stable aqueous suspension to enable the herbicide, pesticide, fertiliser or other agent to be applied as a spray.

The surfactant should be capable of reducing the dynamic wettability of the aqueous liquid to which it is added (although static measurements can be used to determine this). Some surfactants are capable of reducing the static surface tension of an aqueous liquid, but the high molecular weight and resultant low molecular mobility of some surfactants means that it is not possible to lower the dynamic surface tension of an aqueous liquid; this makes them less valuable in some embodiments.

In some embodiments it can bet desirable that the surfactant is non-foaming. However, the wetting composition is not limited to the use of non-foaming surfactants as the foam might be suppressed by the C10-C14 alcohol in the wetting composition, which can act as a foam inhibitor. For example, anionic surfactants, such as the sodium salts of monoalkyl or dialkyl sulfosuccinates, are able effectively to reduce the surface tension of a liquid, but using them leads to the build-up of foam during many applications. In such circumstances, the C10-C14 alcohol may act to inhibit foam formation.

The wetting composition comprises at least one surfactant selected from a non-ionic, cationic, anionic and amphoteric surfactant. Surfactants capable of self-assembling into micelles in an aqueous liquid can be used.

There can be more than one surfactant in the wetting composition and each surfactant can be the same or a different type of surfactant. When surfactant is referred to herein in the singular, it should be understood that it includes more than one surfactant within its scope unless the context makes clear otherwise.

In general, the addition of one surfactant to another generally does not produce an additive effect on surface tension. Rather, under many circumstances, the ability of a surfactant mixture to lower surface tension can be limited to that of the best performing surfactant within the mixture.

Surfactants as described herein (which includes a blend of surfactants) can advantageously have a Hydrophilic Lipophilic Balance (HLB) greater than about 6, 7, 8, 9, 10, 11, 12, 13, 14, 15, 16 or 17.

Advantageously, the surfactant is present in an amount greater than or equal to 25 wt % to a maximum 70 wt % of the wetting composition. The surfactant can be present in an amount of at least about 25, 30, 35, 40, 45, 50, 55, 60, 65, or 70 wt %, or any concentration within those limits. For example, the surfactant component can form from 30 to 65 wt % or 40 to 60 wt % of the wetting composition. Additionally, there can be more than one surfactant and when more than one surfactant is present, the total quantity of surfactants in the wetting composition is within the desired concentration range.

Surfactants used to prepare the wetting composition can be in solid or liquid form. In one embodiment, the surfactant is in liquid form. When mixtures of surfactants are used, the blend of surfactants can be in liquid form. It can be more convenient to combine a surfactant in liquid form with the C10-C14 alcohol and polar component to form the wetting composition described herein. In some embodiments heat can be applied to assist in combining the components.

Surfactants in liquid form can be neat liquids (i.e. containing the surfactant only) or solutions containing a surfactant dissolved or dispersed in a solvent. An exemplary solvent can be water. Thus the surfactant compound forms part of a surfactant solution. Other compounds or components may also be present in the surfactant solution.

Surfactant solutions can comprise a suitable amount of surfactant dissolved or dispersed in the solvent. For example, a surfactant solution can comprise 50%, 60%, 70%, 80%, 85%, 90% or 95% surfactant in a solvent.

It would be appreciated that the surfactant component of the wetting composition is composed of the active surfactant compound or compounds per se. As such, when a surfactant solution is used to prepare the wetting composition, the amount of surfactant solution combined with the C10-C14 alcohol component is selected to ensure that the resulting concentration of active surfactant compound in the final wetting composition is in the range of from 25 to 70 wt %. As an illustration, 100 g of a wetting composition comprising 50 g of a 50 wt % surfactant solution will contain 25 wt % surfactant.

The surfactant can be an ethoxylate such as a nonylphenol alkoxylate or alcohol alkoxylate, such as an alkoxylate (sold as BL8); a dodecyl sulphate; or a quaternised alkyl ammonium compound. The surfactant can one sold under the brand Teric® (any of the Teric series, although preferred are N, 12A, 9A, 13A9, 16A, 7ADN and BL series), DS10025® or DS10030®, Tween®, Dynol® or Surfynol®.

In some embodiments, the surfactant is non-ionic. The non-ionic surfactant (which includes a blend of surfactants) can have a Hydrophilic Lipophilic Balance (HLB) greater than about 6, 7, 8, 9, 10, 11, 12, 13, 14, 15, 16 or 17.

Some examples of non-ionic surfactants that can suitably be used either alone or in combination with one or more other surfactants include: fatty alcohol ethoxylates (such as octaethylene glycol monododecyl ether and pentaethylene glycol monododecyl ether); alkylphenol ethoxylates (such as nonoxynol and Triton X-100); fatty acid ethoxylates (such as stearic, oleic or lauryl fatty acid ethoxylates), ethoxylated amines and fatty acid amides (such as polyethoxylated tallow amine, and amides such as cocamide monoethanolamine and coamide diethanolamine); ethylene oxide/propylene oxide block copolymers (such as poloxamers); fatty acid esters of glycerol (such as glyercol monostearate and glycerol monolaurate); fatty acid esters of sorbitol (including Span® surfactants such as sorbitan monolaurate, sorbitan monostearate and sorbitan tristearate, and their ethoxylates, such as Tween® 20, Tween® 40, Tween® 60 and Tween® 80); fatty acid esters of sucrose; and alkyl polyglucosides (such as decyl glucoside, lauryl glucoside and octyl glucoside). The non-ionic surfactant may be an ethoxylated tetra methyl decyne diol (e.g. Surfynol™ brand), which can be either by itself or in admixture with an alkylene glycol (such as ethylene glycol) or an alcohol alkoxylate.

In one embodiment, the wetting composition comprises an alkyl polyglucoside surfactant. Alkyl polyglucosides are sugar-derived (i.e. glucose and sucrose) surfactants having a hydrophilic sugar-based head group and a $C_8$-$C_{16}$ fatty alcohol tail. Such surfactants can be desirable due to their performance and minimal impact on the environment. Additionally, their biodegradability and derivation from natural sources can make them attractive candidates for environmentally-friendly wetting compositions. The alkyl polyglucoside may be provided in a solution for combining with the C10-C14 alcohol component and polar component to form the wetting composition. For example, the alkyl polyglucoside may be provided in a 50 wt % solution in water.

Fatty acid esters of alcohols such as glycols and glycerol (mono-, di- and tri-esters) can also be desirable in some embodiments as breakdown products from these surfactants may produce minimal environmental impact, making them desirable for agricultural applications.

In some embodiments, the surfactant is anionic. Anionic surfactants can belong to classes selected from sulfate, sulfonate, phosphate and carboxylate surfactants. Anionic surfactants can be used in free acid form or in neutralised form, such as salt forms including ammonium, organic amine, magnesium, potassium and sodium salt forms.

Some examples of anionic surfactants that can suitably be used either alone or in combination with one or more other surfactants include: alkyl sulfates (such as sodium lauryl sulfate and sodium dodecyl sulfate); alkyl ether sulfates (such as sodium laureth sulfate and sodium myreth sulfate); sulfosuccinates (such as sodium dioctyl sulfosuccinate); alkylbenzene sulfonates (such as dodecylbenzene sulfonate and dodecyl diphenyl ether disulfonate); aryl-alkyl ether phosphates; alkyl ether phosphates; and alkyl carboxylates (such as sodium stearate, sodium laurate, and sodium lauroyl sarcosinate). A skilled person would appreciate that other salt forms of the afore-mentioned anionic surfactants may exist.

In some embodiments, anionic surfactants such as mono or di sulphonated or phosphated aliphatic straight chain or branched alcohols can be preferred. Also surfactants derived from direct sulfonation of hydrocarbons, such as alpha olefine sulfonates and secondary alkane sulphonates may be used.

In particular embodiments, mono sulfonated aryl alkyl phenol like surfactants commonly known as LABS acid (Linear Dodecal Benzyl Sulphonic Acid) and LABS salts such as ammonium and triethanol amine LABS are suitable. Dodecyl diphenyl disulphonates (for example Dowfax 2A0) in their free acid and neutralized form may be used, especially in combination with suitable non-ionic surfactants. Dioctyl sulphosuccinate and its sodium and ammonium salts (DOS) may be useful rapid wetting agents, especially in combination with aliphatic alcohol alkoxylates.

In some embodiments, the surfactant is cationic. Cationic surfactants can belong to classes selected from quaternary ammonium compounds and pH-dependent primary, secondary or tertiary amines. Cationic surfactants can be used in neutralised form, such as salt forms including bromide and chloride salt forms.

Some examples of cationic surfactants that can suitably be used either alone or in combination with one or more other surfactants include alkyl quaternary ammonium compounds such as: behentrimonium chloride, benzalkonium chlorides (BAC) including dimethylbenzyl ammonium chloride, cetalkonium chloride (CKC) and stearalkonium chloride, benzethonium chloride, benzododecinium chloride, carbethopendecinium bromide, cetrimonium bromide (CTAB), cetrimonium chloride (CTAC), cetylpyridinium chloride (CPC), didecylmethylammonium chloride, dimethyldioctadecylammonium bromide (DODAB), dimethyldioctadecylammonium chloride, domiphen bromide, octenidine dihydrochloride, and thonzonium bromide. A skilled person would appreciate that other salt forms of the afore-mentioned cationic surfactants may exist.

A preferred cationic surfactant belongs to the class of benzalkonium chlorides (BAC) and may be selected from dimethylbenzyl ammonium chloride, cetalkonium chloride and stearalkonium chloride surfactants.

In some embodiments, the surfactant is amphoteric. Amphoteric surfactants have acidic and basic groups within the same surfactant molecule. The acidic and basic groups can form anionic or cationic groups, depending on pH. Amphoteric surfactants can be zwitterionic and carry both a negative and positive charge at certain pH.

An amphoteric surfactant may be employed in some circumstances as such surfactants can behave as cationic or anionic surfactants under certain pH conditions. For example, at acidic or low pH (e.g. pH≤6), the amphoteric surfactant will become protonated and can act as cationic surfactants, whereas at alkaline or high pH (e.g. pH≥8), the amphoteric surfactant will become deprotonated and act as an anionic surfactant.

Some examples of amphoteric surfactants that can suitably be used either alone or in combination with one or more other surfactants include alkyl amine oxides such as lauramine oxide and myristamine oxide; betaines such as cocamidopropylbetaine; hydroxysultaines such as lauramidopropyl hydroxysultaine, cocamidopropyl hydroxysultaine, oleimidopropyl hydroxysultaine, tallowamidopropyl hydroxysultaine, erucamidopropyl hydroxysultaine, and lauryl hydroxysultaine; and amphoacetates such as sodium lauramphoacetate.

In one embodiment, the wetting composition does not comprise a zwitterionic surfactant, such as an amphoteric surfactant in zwitterionic form.

In one set of embodiments the wetting composition comprises a surfactant selected from an alcohol alkoxylate, an alkylbenzene sulfonate and a benzalkonium chloride surfactant. Mixtures of surfactants are also contemplated. For instance, the wetting composition can comprise a surfactant mixture of an alcohol alkoxylate and an alkylbenzene sulfonate.

In some embodiments, one of the surfactants in a mixture of surfactants may act as an emulsifying agent to assist in maintaining the wetting composition as a stable formulation.

In one embodiment, the wetting composition can comprise a mixture of surfactants with one of the surfactants being an alkylbenzene sulfonate such as dodecylbenzene sulfonate. The alkylbenzene sulfonate can act as an emulsifier to help stabilise the wetting composition and prevent or minimise phase separation of the composition components. The wetting composition may only require a relatively small amount of alkylbenzene sulfonate as an emulsifier. In one embodiment, the wetting composition comprises up to 5 wt % of alkylbenzene sulfonate.

The wetting composition of the invention also comprises from 5 to 50 wt % of a polar component. The polar component comprises at least one selected from (i) water and (ii) up to 25 wt % of a water-miscible C1-C3 organic solvent. The C10-C14 alcohol and surfactant of the wetting composition is thus combined with at least one of water and a water-miscible C1-C3 organic solvent, which is in the polar component.

The presence of a polar component in the wetting composition can be desirable as it is thought to help to compatibilise the C10-C14 alcohol and surfactant in the wetting composition. Thus the polar component might act as a compatibilising agent for the C10-C14 alcohol and surfactant. The polar component might also help to solubilise the C10-C14 alcohol and surfactant in the wetting composition in the aqueous liquid in which the wetting composition is to be added.

In some embodiments, the polar component comprises water. Water may be present in the polar component of the wetting composition in a suitable amount. For instance, the polar component can comprise water in an amount of 0.5%, 1%, 2%. 2.5%, 5%, 7.5%, 10%, 12.5%, 15%, 20%, 25%, 30%, 40% or 50 wt %, or any concentration within these limits.

When the polar component comprises water at a concentration of 5 wt % or greater, the water can be on its own or in admixture with at least one other compound. When the water is in an admixture, the quantity of components in the polar component is not greater than 50 wt % in total.

When the polar component comprises water at a concentration of less than 5 wt %, it will be necessary for the water to be in admixture with at least one other compound in order to ensure that the polar component is at least 5 wt %. As an illustration, if water is present at a concentration at 2.5 wt %, the polar component would also comprise 2.5 wt % of at least one other component in order to ensure the polar component forms at least 5 wt % of the wetting composition.

Water may be added as part of another component of the wetting composition, or it may be deliberately added as a separate component. In one embodiment, the polar component of the wetting composition comprises from 5 to 10 wt % water.

It would be appreciated that water present in the wetting composition is distinguished from the target aqueous liquid (which can be water or liquids containing water) whose surface tension is desirably to be lowered by the wetting composition, and to which the wetting composition per se is to be added.

In one embodiment, the polar component comprises up to 25 wt % of a water-miscible C1-C3 organic solvent. The water-miscible C1-C3 organic solvent can be present in the polar component of the wetting composition in an amount of from 5 to 25 wt %.

The polar component can comprise a water-miscible C1-C3 organic solvent in an amount of 0.5%, 1%, 2%. 2.5%, 5%, 7.5%, 10%, 12.5%, 15%, 20% or 25% wt %, or any concentration within these limits.

When the polar component comprises a water-miscible C1-C3 organic solvent at a concentration of 5 to 25 wt %, the solvent can be on its own or in admixture with at least one other compound. When C1-C3 organic solvent is in an admixture, the quantity of components in the polar component does not exceed 50 wt % in total.

When the polar component comprises a water-miscible C1-C3 organic solvent at a concentration of less than 5 wt %, it will be necessary for the solvent to be in admixture with at least one other compound in order to ensure that the polar component is at least 5 wt %. As an illustration, if a water-miscible C1-C3 organic solvent is present at a concentration at 2.5 wt %, the polar component would also comprise 2.5 wt % of at least one other component in order to ensure the polar component forms at least 5 wt % of the wetting composition.

By "water-miscible" is meant the C1-C3 organic solvent is capable of mixing with water to form a homogeneous solution. Examples of water-miscible C1-C3 organic solvents include acetaldehyde, acetone, acetonitrile, dimethyl formamide, dimethyl sulfoxide, ethanol, ethylene glycol, glycerol, methanol, n-propanol, iso-propanol, 1,3-propane diol, and propylene glycol. Water-miscible C1-C3 organic solvents can be polar solvents.

In one embodiment, the water-miscible C1-C3 organic solvent is a water-miscible C1-C3 alcohol, such as methanol, ethanol, n-propanol and iso-propanol, preferably ethanol.

It can be desirable to limit the amount of water-miscible C1-C3 organic solvent, (such as C1-C3 alcohol) in the wetting composition to less than 25 wt % due to the flammability of the solvent. In some embodiments, it can be desirable for the C1-C3 organic solvent to be present in an amount of no more than 20%, 15%, 10%, or 5 wt % of the wetting composition.

In some embodiments, the polar component of the wetting composition comprises a combination of water and a water-miscible C1-C3 organic solvent. In such embodiments, the amount of water-miscible C1-C3 organic solvent in the combination does not exceed 25 wt %. A skilled person would appreciate that water and water-miscible C1-C3 organic solvent can each be polar compounds.

In some embodiments, the wetting composition of the invention can consist essentially of C10-C14 alcohol, surfactant and a polar component, in the amounts as defined herein. Thus in some embodiments, where the quantity of C10-C14 alcohol and surfactant used to prepare the wetting composition do not add up to 100%, the polar component can be added to alcohol and surfactant components to bring the total mass or volume of the wetting composition to 100%. The polar component can therefore form the remainder of the wetting composition.

Optionally, one or more additives can be incorporated in the wetting composition. These additives can include fragrances, anti-foam agents, antifreeze agents, emulsifiers, active compounds, salts, dyes (or other colourants) and particles (for example, pigment particles such as titanium dioxide), stabilisers, preservatives and/or buffers, which can be present singly or in combination. These additives may be present in the wetting composition in a suitable amount. The desired amount might depend on the effect desired to be imparted to the wetting composition as a result of the use of these additives (e.g. fragrance or colour intensity). In some embodiments, the wetting composition may comprise from 0 to 5 wt %, 0 to 10 wt %, 0 to 20 wt %, or 0 to 25 wt % of one or more additives. In one embodiment, the wetting composition may comprise a chemical compound that has a fragrance that provides a pleasant smell. Although the wetting composition of the invention is not strongly odorous, fragrances can be added to the wetting composition if desired to impart a pleasing smell or to reduce or mask any disagreeable odour.

In one embodiment the fragrance is an essential oil. The essential oil can be a lemon or orange oil or a pine oil. The fragrance can comprise a phenolic aldehyde. The phenolic aldehyde can be vanillin or isovanillin. The fragrance can be added in concentrated form or in a solvent as a 1, 2, 5, 10 wt % solution. For example, vanillin can be added in a solvent such as ethanol (e.g. at 10 wt %).

The wetting composition is advantageously non-hazardous. It is also advantageous if the wetting composition is non-flammable. The wetting composition should be stable at high temperatures, for example up to 40° C. In order to ensure these characteristics are met, the components of the composition must also meet these requirements individually and/or when combined together.

In some embodiments, components of the wetting composition, including the C10-C14 alcohol, surfactant and polar component are preferably chosen from environmentally friendly compounds that can readily degrade into breakdown products that are non-toxic and non-hazardous to the environment and plant, marine and animal life. This can be advantageous as it allows the wetting composition of the invention to avoid the significant environmental and biological issues associated with fluorosurfactants and organosilicone surfactants.

In one embodiment the wetting composition comprises 1-dodecanol (20% to less than 50%), a non-ionic surfactant (25 to 70%), and about 10% water.

In another embodiment the wetting composition comprises a blend of 1-dodecanol and 1-tetradecanol (20% to less than 50% of a 70:30 blend of C12 and C14 alcohols), a non-ionic surfactant (25 to 70%), and about 10% water.

In another embodiment the wetting composition comprises 1-dodecanol (20% to less than 50%), a non-ionic surfactant (25 to 70%), and ethanol (25%).

In all embodiments of the wetting composition described above there can be added as an option ≤10% dodecylbenzene sulfonate as an emulsifier.

The formulated wetting composition is intended to be added to an aqueous liquid to modify the surface tension of the aqueous liquid.

The wetting composition is desirably in the form of a stable mixture comprising the C10-C14 alcohol, surfactant and polar component. The wetting composition can be in the form of a stable solution, suspension or emulsion. By being "stable" is meant that there is no clouding or change in the viscosity of the wetting composition, or substantial separation (e.g. phase separation, settling or sedimentation etc.) of the components of the wetting composition after formation of the composition or during its storage. The wetting composition can be stable at temperatures in the range of from 4 to 40° C. for at least 5 hours. In preferred embodiments the wetting composition is stable for several weeks, months or years providing an extended shelf life. However, in some embodiments the wetting composition can be prepared just prior to use in which case it only needs to be stable for a short period. For example, for some compositions of higher molecular weight alcohols, such as C12 to C14, heat may be of assistance in combining the alcohol with the surfactant. In such circumstances the wetting composition can be used before any separation occurs.

Turbidity studies of the wetting composition can aid in the assessment of the stability of the formulation.

To form the wetting composition, a desired quantity of surfactant is first combined a desired amount of C10-C14 alcohol, then a desired quantity of polar component (e.g. water and/or water-miscible C1-C3 organic solvent) is added to the initial mixture and combined to form the wetting composition. However, the order of manufacture is not critical, and the components of the wetting composition can be combined together in any order. For example, the surfactant and polar component can be mixed together first, before adding the C10-C14 alcohol. Additionally, the surfactant may be mixed in last.

If the wetting composition is to comprise a mixture of at least two different C10-C14 alcohols, such as a mixture of 1-dodecanol (C12 alcohol) and either 1-decanol (C10 alcohol) or 1-tetradecanol (C14 alcohol), a desired amount of the selected alcohols can be combined with the surfactant either separately or in combination.

In some embodiments, a blend of two or more different C10-C14 alcohols is added to a mixture comprising the surfactant and water and/or other additives. For example, there is available commercial preparations containing 1-dodecanol and 1-tetradecanol in a relative C12:C14 proportion of 70:30. A selected quantity of the commercial preparation can be combined with the surfactant and additive in order to introduce the different alcohols to the mixture. If desired, one or more additional C10-C14 alcohols can also be added. For example, in addition to the alcohol blend, a further quantity of 1-dodecanol (C12 alcohol) may be combined with the surfactant to introduce a further alcohol and/or to alter the relative proportion of C10-C14 alcohols in the wetting composition.

It is important that the wetting composition be prepared as a complete formulation prior to addition to an aqueous liquid, be it water, an aqueous resin, agricultural product or any other aqueous material.

Thus the C10-C14 alcohol, surfactant and polar component (e.g. water and/or water-miscible C1-C3 organic solvent) are together in the wetting composition such that they are added in combination to a target aqueous liquid and are not added to the aqueous liquid separately. Specifically, the alcohol wetting agent is not added incrementally to an aqueous solution of the surfactant. An advantage of adding the C10-C14 alcohol together with the surfactant to the aqueous liquid is that the wetting composition can be sold, transported and stored conveniently before use. Another advantage is that upon addition of the wetting composition to an aqueous liquid, the relative concentrations of the C10-C14 alcohol and surfactant are fixed so the end user does not need to consider how much of each component to add to the aqueous liquid.

In use, the wetting composition is added to an aqueous liquid and reduces the surface tension of the aqueous liquid.

Advantageously, the wetting composition of the invention enables an aqueous liquid containing the wetting composition to achieve a surface tension below 25 mN/m at 20° C. In some embodiments, the wetting composition of the invention is capable of reducing the surface tension of an aqueous liquid containing the wetting composition to less than 24 mN/m, 23 mN/m, 22 mN/m, 21 mN/m, 20 mN/m, or 19 mN/m at 20° C.

The ability to achieve such low surface tensions with the wetting composition of the invention is unexpected. Low surface tensions of equivalent value are commonly believed to be achievable only with fluorosurfactants and organosilicone surfactants. The wetting composition of the invention is preferably free of fluorosurfactant and organosilicone surfactant. As such, the ability of the wetting composition to attain such low surface tension values in the absence of fluorosurfactants and organosilicone surfactants is surprising.

A skilled person can determine the surface tension of an aqueous liquid containing the wetting composition of the invention using known techniques. One exemplary technique is pendant drop goniometry, which allows surface and interfacial tensions to be determined from optical analysis of the geometry of a pendant drop.

Surfactants, once added to the aqueous liquid, can lower the surface tension of the liquid by assembling at the liquid/vapour interface. However, the combination of C10-C14 alcohol with the surfactant in the wetting composition of the invention is able to enhance the performance of the surfactant to surprisingly enable further reductions in surface tension to be achieved beyond that possible with the surfactant alone. The C10-C14 alcohol and surfactant may interact in an additive or synergistic manner to lower surface tension.

Without wishing to be limited by theory, it is believed that the insoluble C10-C14 alcohol limits or even prevents the formation of micelles in non-ionic, anionic and cationic surfactants, resulting in a greater concentration of surfactant molecules in solution able to migrate to the three phase wetting interface, thereby improving the normal wettability performance of these surfactants.

As C10-C14 alcohols are insoluble or sparingly soluble in water and are difficult to disperse, the presence of a polar component comprising at least one selected from water and a water-miscible C1-C3 organic solvent can aid in dispersing and compatibilising the C10-C14 alcohol in the presence of the surfactant.

The dispersed C10-C14 alcohol can be in a metastable state in the aqueous liquid in which the wetting composition has been added and will have a tendency to phase separate from the aqueous solution very rapidly, resulting in rapid migration of the alcohols and associated surfactants to the wetting interface. It is believed that this fast migration to the three-phase interface assists in dispersion of the surfactant at the interface and contributes to improvements in the ability of the aqueous liquid to wet a surface, such as a low energy surface.

Phase separation of the C10-C14 alcohol may also form small droplets or micro-colloids that offer a large surface area for dispersion of the surfactant molecules.

The C10-C14 alcohol may also limit or even prevent the formation of surfactant micelles in the aqueous liquid, resulting in a greater concentration of surfactant molecules in solution able to migrate to the three phase wetting interface, improving the normal wettability performance of these surfactants.

In some embodiments, micelles do not form or there is a decreased formation of micelles in an aqueous liquid comprising the wetting composition of the invention. By "micelles do not form" or there is a "decreased formation of micelles" in the aqueous liquid, it should be understood that there may be a few micelles that self-assemble in the aqueous liquid.

A disadvantage of forming micelles is that there is less surfactant available for decreasing the surface tension of the aqueous liquid and for dispersing the alcohol, For example, if the surfactant forms micelles, there is less surfactant available for stabilising any emulsion that forms. Instead of micelles breaking down before the surfactant molecules diffuse to the wetting interphase the long chained alcohol which is combined with the surfactant rapidly moves to the wetting interphase as it is in a metastable state whilst in solution. This results in a high concentration of the associated surfactant migrating to the wetting interface much more rapidly than would have been the case with the surfactant alone, which would have been limited by critical micelle concentration.

Rapid migration of the C10-C14 alcohol to the three-phase wetting interface releases surfactant molecules, which in the absence of micelles also rapidly diffuse to the three phase wetting interface, resulting in a reduction in the stick-slip phenomenon as the aqueous liquid rapidly spreads across a low energy surface caused by the diffusion of the surfactant molecules from within the solution to the liquid/air interphase at the three-phase contact line.

The liquid to which the wetting composition is added is aqueous or substantially aqueous. An aqueous liquid includes water. The aqueous liquid can be pure water (or substantially pure water), or recycled or waste water. The aqueous liquid can be a solution containing water. The liquid can be any aqueous liquid that desirably wets a low energy hydrophobic surface.

The aqueous liquid can consist of or comprise an agricultural composition. The agricultural composition can be for use as a pesticide, insecticide, acaricide, fungicide, nematocide, disinfectant, herbicide, fertilizer or micronutrient. In one embodiment, the agricultural composition is glyphosate (N-(phosphonomethyl) glycine). Glyphosate is a broad-spectrum systemic herbicide used to kill weeds, especially annual broadleaf weeds and grasses known to compete with e.g. crops. The wetting composition of the invention could be used in a composition applied to powdered water soluble herbicides, such as Brush-Off™ by Dupont. The wetting composition can be added to other herbicides such as MCPA (2-methyl-4-chlorophenoxyacetic acid), 2-4D (2,4-dichloro phenoxyacetic acid), and woody weed herbicides such as Triclopyr (3,5,6-trichloro-2-pyridinyloxyacetic acid) or Picloram. In one embodiment the wetting composition can be added to foliar fertilisers applied to plant foliage such as nitrogen, and magnesium, calcium and, boron fertilisers, or nitrogen, phosphorous and potassium (NPK) type fertilisers.

The wetting composition can increase the ability of the agricultural composition to wet the surfaces of foliage. In another embodiment, the wetting composition can increase the ability of the agricultural composition to wet the surfaces of a timber-based substrate to provide a deterrent to pests. For example, sawn timber can be impregnated and/or dipped in an insecticide and/or fungicide before use. Furthermore, the wetting composition can improve the ability of an agricultural composition to wet seeds. For example, seeds can be coated with an insecticide and/or fungicide to protect them prior to germination. Seed coloration agents can also be added with the wetting system. In these embodiments the incorporation of polyacrylamides or polyacrylates of medium to high molecular weight (for example 250,000 to 100,000) into the final spray mixture can be of assistance in stabilising the droplets, minimising evaporation of the aqueous liquid after spraying and/or other application to the low energy surface, and preventing any overspray damage.

In some embodiments, the wetting composition allows the formation of a finer aerosol spray of the agricultural composition which can be applied e.g. to crops.

In one embodiment there is provided an agricultural composition comprising a wetting composition of the present invention.

The aqueous liquid can consist of or comprise a pharmaceutical, neutraceutical or cosmetic. In one embodiment, the liquid consists of or comprises a drug compound. In one embodiment, the wetting composition can increase the ability of the pharmaceutical, neutraceutical or cosmetic to wet the surfaces of a human or animal body including skin, hair and/or nails. In some embodiments, the wetting composition allows the formation of a finer aerosol spray of the pharmaceutical, neutraceutical or cosmetic e.g. a hairspray. For example, a drug can be delivered as an aerosol.

An advantage of the wetting composition described is that upon addition to an aqueous liquid any solids in the liquid can be dispersed by the composition and there is thus a reduced tendency for the solids to "drop-out". This means that the wetting composition allows wetting with higher-solids-content aqueous liquids than could otherwise be used, i.e. in the absence of the wetting composition. The advantage of wetting with a high solids content liquid is that there is less chromatographic separation of the liquid upon impregnation of the liquid into a solid. A reduced separation of the liquid results in a more homogenous impregnated solid, which is ultimately stronger and more durable. Another advantage of solids dispersal is that low energy surfaces can be wet with more viscous aqueous liquids.

The aqueous liquid can be a complex liquid. The complex liquid can be an aqueous-based resin, a water-based paint or a dye. The resin can have a high viscosity with the ability to harden or cure. The resin can be a naturally occurring substance that is produced by certain trees. However, the resin can be natural or synthetic. The resin can be an epoxy, vinyl ester or polyester resin. The resin can be an amine or a formaldehyde type resin. In some embodiments, the resin is a polyvinylchloride, a polyvinyl acetate or a resorcinol resin. In one embodiment, the aqueous liquid is a resin for wetting paper or wood particle flake.

In one embodiment there is provided a resin comprising a wetting composition of the present invention.

In another embodiment the wetting composition can be used in aqueous liquids employed for dust suppression in mining, road construction or other civil construction works requiring dust suppression. It can also be added to water to minimise the spreading of dust by spreading an emulsion of very small droplet sizes giving maximum coverage and dust suppression with minimal volumes of liquid. In this instance the wetting composition could be added to pure water or waste or recycled water or any aqueous fluid considered suitable.

The wetting composition can be used in aqueous liquids for producing a firefighting foam.

The wetting composition can be added to a cement composition used to form concrete to enhance the spreading or flowability of the concrete and assist in penetration of the concrete.

The wetting composition can be used in liquids employed for the separation of crude oil from water to enable recovery the crude oil. In that regard, the wetting composition could help disrupt the oil-water interface and thus assist in separating the oil from water.

Upon addition of the wetting composition to the aqueous liquid, the surface tension of the aqueous liquid is decreased. The surface tension of the aqueous liquid is decreased upon addition of the wetting composition compared to the surface tension of the same aqueous liquid in the absence of the wetting composition. It follows that the contact angle of the aqueous liquid having the wetting composition therein is decreased on a low energy hydrophobic surface compared to the same aqueous liquid in the absence of the wetting composition. The wetting composition when added to an aqueous liquid increases the aqueous wettability of a low energy surface. In other words, the wetting composition can be used to increase the aqueous wettability of a hydrophobic surface.

According to another aspect of the invention, there is provided a method of lowering the surface tension of an aqueous liquid, the method comprising the step of adding a wetting composition of any one of the embodiments described herein to the aqueous liquid.

According to another aspect of the invention there is provided an aqueous liquid composition comprising a wetting composition of any one of the embodiments described herein with an aqueous liquid. The aqueous liquid composition comprising the wetting composition can be a reduced surface tension composition due to the presence of the wetting composition therein.

An aqueous liquid composition comprising the wetting composition can be a reduced surface tension resin composition or an agricultural composition.

Aqueous liquid compositions comprising the wetting composition can be aerosol or spray compositions, which is formulated to provide a mist of liquid droplets in a gas such as air. Upon reducing the surface tension of the aqueous liquid by addition of the wetting composition of the invention, the aqueous liquid with the wetting composition can be dispensed or ejected from a suitable liquid reservoir as an aerosol or spray of smaller droplet size compared to the same aqueous liquid in the absence of the wetting composition. An aerosol or spray with reduced droplet size would provide better coverage for the same volume of applied liquid, thereby providing a more efficient spray. The aerosol can be formulated for use in the paint industry, for example spray paints. Alternatively, the aerosol can be for use as a cosmetic, such as a deodoriser or a hairspray. In some embodiments, the aerosol is an agricultural spray such as an insecticide. The aerosol could also be for use as a cleaning agent.

In another aspect of the present invention there is provided a method of reducing the droplet size of an aerosol spray dispensed from an aerosol spray device associated with a liquid reservoir comprising adding the wetting composition of the invention to the liquid reservoir associated with the aerosol spray device, and spraying the liquid from the device.

The wetting composition of the invention can be added to the aqueous liquid by any means. In one embodiment, the wetting composition is added to the aqueous liquid drop wise. The addition of the wetting composition can be undertaken manually or it can be controlled by a computer, which programs a delivery system. Different aqueous liquids will require different amounts of the wetting composition in order to achieve the desired decrease in surface tension. In some embodiments, the wetting composition is added incrementally (noting that the C10-C14 alcohol and surfactant are still added together). Following the addition of each increment, the aqueous solution can be observed with respect to its surface tension and ability to wet a low energy hydrophobic surface. Once the desired wetting has been achieved, no further amount of the wetting composition need be added to the aqueous liquid. Alternatively, a known amount of the wetting composition can be added to the aqueous solution. The known amount can be determined based on prior experiments.

The amount of wetting composition added to the aqueous liquid is not limited as there is no undesirable micelle formation. Therefore, unlike surfactants which reach a certain level of wettability up to the concentration that micelles form (critical micelle concentration) the wetting composition of the invention can be added up to any practical concentration to improve wetting on very difficult to wet surfaces such as Teflon or other surfaces of very low surface energy. In some embodiments, the surface tension of the aqueous liquid can be further lowered upon the addition of increasing amounts of wetting composition to the liquid.

The amount of the wetting composition added to the aqueous liquid should ensure that the wetting composition has an advantageous affect on the wettability of the aqueous liquid with respect to the surface. The amount of wetting composition added to the aqueous liquid can be about 10, 5, 4, 3, 2, 1.5, 1, 0.15, 0.05, 0.10 or 0.005 vol %. In one embodiment, the wetting composition is added to the aqueous liquid in an amount in a range selected from 0.1 to 5 vol %, 0.5 to 4 vol %, and 1 to 3 vol %. If too much wetting composition is added, this can represent unnecessary expense. If too little is added there will be no desirable effect on wetting. In some embodiments, the amount of wetting composition is added to result in an aqueous liquid having about 0.5, 0.3, 0.1 or 0.15 wt % C10-C14 alcohol. The only deleterious effect caused by overdosing with wetting composition appears to be that wetting occurs too rapidly, which is rarely a problem. Lower doses of the wetting composition can be used to improve the wettability of an aqueous liquid, compared to conventional surfactants.

Unlike conventional surfactants, where micelle formation can limit the ability of the surfactant to reduce surface tension once the critical micelle concentration is reached, the wetting composition of the invention can continue to provide for increasing reductions in surface tension with increasing doses of the wetting composition to an aqueous liquid.

Following the addition of the wetting composition to an aqueous liquid, the surface tension of the aqueous liquid can be decreased to less than about 70 dynes/cm. In particular embodiments, the wetting composition can advantageously decrease the surface tension of the aqueous liquid to less than about 25, 24, 23, 22, 21, 20 19 or 18 dynes/cm. In some embodiments, it may be desirable to decrease the surface tension to the minimum possible. In other embodiments, it may only be necessary to decrease the surface tension to just below that which is achieved by current anionic, cationic and non-ionic surfactants. In other embodiments it may be desirable to achieve a similar surface tension as that of current superspreaders i.e. <23 dynes/cm. In other embodiments it may be desirable to achieve a similar surface tension as that of current organosilicone superspreaders i.e. <20 dynes/cm. In other embodiments it may desirable to achieve a similar surface tension as that of current fluorosurfactant superspreaders, i.e. <18 dynes/cm. The desired surface tension can be determined by the person skilled in the art and the corresponding amount of wetting composition required to achieve this can be added.

The addition of the wetting composition to the aqueous liquid can also influence the static or advancing aqueous contact angle of the aqueous liquid at the surface, reflecting an improvement in wettability. In some embodiments, the advancing aqueous contact angle of the liquid can be decreased to less than about 90, 80, 70, 60, 50, 40, 30, 20, 10 or 5°. In one embodiment the advancing contact angle of the aqueous liquid can be decreased to less than 10°. The desired wettability can be determined by the person skilled in the art.

The wetting composition of the invention can act as a 'superspreader' to assist in the spreading of an aqueous liquid on a low surface energy surface. The wetting composition of the invention can perform at a level that is at least equivalent or better than organosilicone surfactants or fluorosurfactants that are currently known.

The increased aqueous wettability of the low energy surface can mean that the surface can be coated more quickly with a liquid comprising the wetting composition of the invention. The wetting of the low energy surface can be one, two or three orders of magnitude faster than for liquids not making use of the invention. This represents a cost and time saving. In some embodiments, less aqueous liquid is required to coat or impregnate the surfaces of a substrate again representing significant commercial benefits. The reduced amount of liquid required to provide a coating should not have any adverse effect on product quality. With respect to resin coatings, in some embodiments, less resin will be required but there will be no change in Taber abrasion resistance, scratch, stain and/or impact resistance of the final resin coated or impregnated product.

An article comprising wood particle flake coated with the resin modified according to the invention (i.e. by the addition of the wetting composition) can have improved machinability. By improved machinability it is meant that the incidence of "chip-out" i.e removal of individual non-resinated flakes or groups of flake from the surface layer of the panel that is critical for the adhesion of the laminate and the strength of the panel is reduced. This is thought to be attributed to improved resin distribution on individual flakes and a decreased variation in resin distribution between flakes. The use of the wetting composition of the invention in this embodiment allows for flexibility in the set up of blenders designed to mix the resin and flake. This can result in reduced motor current and power savings. With respect to the resin distribution, there is a potential for reduced resin usage and/or a reduction in the density and hence amount of wood used which inevitably leads to cost savings.

In other embodiments, the wetting composition allows the formation of an aerosol comprising smaller droplets than an aerosol formed by the same liquid in the absence of the wetting composition. The aerosol is a mist of liquid droplets.

The wetting composition can be added prior to the aerosol formation, or at the same time as the aerosol is formed i.e. as the droplets of mist are produced.

The smaller the droplets of an aerosol the more readily the droplets disperse in air, so it follows that a finer mist can cover a larger surface area. In one embodiment, the average droplet size of an aerosol formed using the wetting composition according to the invention is about 10, 20, 30, 40, 50, 60, 70 or 80% less than the droplet size of the same liquid in the absence of the wetting composition. In one embodiment, an aerosol prepared using the wetting composition of the present invention is able to disperse into an area 10, 20, 30, 40, 50, 60, 70 or 80% larger than an aerosol of the same liquid in the absence of the wetting composition.

According to a further aspect of the invention, there is provided a method of wetting a low energy surface with a relatively high surface energy liquid, the method comprising the steps of:
- adding the wetting composition of embodiments of the invention to the liquid; and
- contacting the low energy surface with the liquid comprising the wetting composition.

The contact angle of the liquid comprising the wetting composition is decreased on the low energy surface compared to the contact angle of the same liquid in the absence of the wetting composition.

Methods for determining contact angle would be known to one skilled in the art. For example, contact angle goniometry is an example of one suitable method. Contact angle goniometry can allow direct assessment of the effect of the wetting composition on a target aqueous liquid and the ability of the treated aqueous liquid to wet a target substrate, such as leaf, timber, paper etc.

Adding the wetting composition of the invention to an aqueous liquid can result in quick and substantially complete wetting of a hydrophobic surface by the aqueous liquid. The C10-C14 alcohol in the wetting composition is believed to reduce the chance of formation of surfactant micelles which would interfere with the wetting action.

The low energy surface may form part of a substrate and it can be desirable to improve the wetting of the substrate with an aqueous liquid by using the wetting composition described herein.

The substrate that is desirably wet by the aqueous liquid comprising the wetting composition of the invention therein is not limited. The substrate can have a relatively large contiguous surface area or the substrate can be particulate. The substrate can be fibrous or porous. In one embodiment, the substrate is paper. In another embodiment, the substrate is an artificial fibre such as glass fibre insulation. The substrate can be a natural product. In one embodiment, the substrate is leather. The substrate can comprise natural or synthetic fibres. The natural fibres can be wool. The natural fibres can be treated, e.g. leather treated wool. The synthetic fibres can comprise or be composed of PTFE, polyester, nylon, acrylic, rayon, acetate, spandex, acrylic (e.g. Orlon™), or para-aramid (e.g. Kevlar®). The substrate can be a synthetic polymer, such as poly(tetrafluoroethylene) (Teflon®). The substrate can be a seed. The substrate can be foliage including plant leaves, shoots, stalks and roots. The substrate can be wood-based or timber-based. Timber based products include wooden artefacts such as musical instruments; bamboo articles; cane and rattan; cork products and wicker products. Other timber based products include sawn timber, plywood, veneers and reconstituted wood products including chipboard, hardboard, medium and high density fibre board (MDF), orientated strand board and particle board. The substrate can be a foliage-based. Foliage-based substrates can be leaves, branches, seeds, stalks, bark, roots, or any part of the plant either living or dead. The substrate can also be wood particle flake that can be a component of a reconstituted wood product or can be sawn timber that is impregnated, for example pressure impregnated, or dipped with an insecticide or fungicide.

The surface of the substrate desirably wet by the aqueous liquid comprising the wetting composition has a low surface energy. The surface can have a surface energy of less than about 50, 40, 30 or 25 dynes. The surface of the substrate is hydrophobic. By "hydrophobic" it is meant that the surface has a static or advancing water contact angle of greater than about 90, 100, 110, 120, 130, 140, 150, 160, 170 or 175°. The hydrophobicity can be imparted by chemical functionality at the top few layers of the surface of the substrate. Alternatively, or in addition, the hydrophobicity is provided by surface roughness. Surface roughness includes porosity at the surface and other morphological features providing roughness.

The wetting composition can be used to increase the spreading of an aqueous liquid drop across the surface. The wetting composition can be used to increase the penetration of an aqueous liquid into a substrate. The penetration of an aqueous liquid allows for the impregnation of a porous substrate by an aqueous liquid.

The wettability of the surface can be measured by any means known to the person skilled in the art. The wettability can be determined by contact angle goniometry. Advantageously, the wettability is determined using sessile (or static) drop measurements.

Wettability can be determined using methods that measure changes in the surface tension of an aqueous liquid, including water, such as pendant drop goniometry. An aqueous liquid not containing the wetting composition can be used as a comparator with reductions in surface tension assessed by reference to the comparator.

Alternatively, the wettability is determined using advancing and/or receding contact angle measurements optionally measured using a Wilhelmy balance. Any comparative data should use the same time of wettability measurement.

The wetting composition can increase the ability of an agricultural composition to wet the surfaces of foliage. In another embodiment, the wetting composition can increase the ability of an agricultural composition to wet the surfaces of a timber-based substrate to provide a deterrent to pests. For example, sawn timber can be impregnated and/or dipped in an insecticide and/or fungicide before use. Furthermore, the wetting composition can improve the ability of an agricultural composition to wet seeds. For example, seeds can be coated with an insecticide and/or fungicide to protect them prior to germination. Seed coloration agents can also be added with the wetting system.

The surface of a substrate can be coated or impregnated with the aqueous liquid comprising the wetting composition. In embodiments in which the substrate surface is coated by the aqueous liquid, advantageously at least about 90, 80, 70, 60 or 50% of the total available surface area is coated. In embodiments in which a porous substrate surface is impregnated, advantageously at least about 90, 80, 70, 60 or 50% of the total available void space is filled with the liquid.

In another aspect of the invention there is provided a product having a low energy surface coated or impregnated with an aqueous liquid composition comprising a wetting composition as described herein. The product may be a paper or a particleboard that is coated or impregnated with the aqueous liquid composition. In one embodiment, a substrate desired to be wet can be pre-coated or pre-impregnated with an aqueous liquid composition comprising the wetting composition of the invention. Pre-coating or pre-impregnation of the substrate can help to improve the contact of the substrate with a later applied aqueous liquid composition also treated with a wetting composition. For example, particleboard flake can be pre-coated with an aqueous liquid composition comprising a wetting composition of the invention (e.g. by spraying the aqueous liquid containing the wetting composition onto the flake), prior to being bonded with other flake to form a particleboard. The pre-coated flake can assist with increasing the surface energy of the particleboard and thereby enable the particleboard to more easily wet by an aqueous liquid composition also comprising a wetting composition.

It has also been found that substrates of modified surface energy can be formed using the wetting composition of the invention. For instance, the surface energy of a particleboard substrate can be modified by forming the particleboard with particleboard flake pre-coated with an aqueous liquid comprising the wetting composition of the invention. This can enable the particleboard to more easily wet by a normal liquid, such as normal resin, which can be an aqueous or non-aqueous liquid. In some embodiments it is believed that the wetting composition can increase the surface energy of the particleboard substrate, thereby reducing the interfacial energy between the particleboard and the liquid (e.g. resin) desired to wet the particleboard substrate, allowing the liquid to more spread more effectively on the substrate. This in turn can enhance the ability of the resin to wet the particleboard substrate and can result in improvements in the mechanical properties of the substrate, such as particleboard bending and tensile strength.

Embodiments of the invention will now be described with reference to the following examples, which are not limiting in any way.

EXAMPLES

General Procedure for Preparing Wetting Compositions

To form the wetting compositions of the Examples described below, an initial mixture is formed by combining a desired amount of surfactant with a desired amount of C10-C14 alcohol. The initial mixture is then combined with a desired amount of water or ethanol. The components are then mixed to provide the wetting composition.

Examples 1 to 6: Wetting Compositions and Effect of Wetting Compositions on Surface Tension Using the above general protocol, a range of different wetting compositions containing range of different types and quantities of components were prepared, as detailed in Table 1.

The prepared wetting composition samples were diluted with ultra-pure water to form aqueous compositions having the wetting composition at concentrations of 0.1%, 0.5% and 1.0 wt %. The surface tension of the prepared samples was then assessed by pendant drop goniometry. Reference samples (R1 to R4) of water only, or water with surfactant only or C12 alcohol only, as well as a comparative example (CE1) containing 1-octanol (C8 alcohol) with surfactant were also prepared and tested.

Surface tension (mN/m) measurements were performed on the aqueous compositions containing different concentrations of test compositions using pendant drop goniometry. Ultra-pure water was used to check the goniometer at 20° C. after image had been calibrated with 4.0002 mm titanium ball.

Table 1 also shows of the results of surface tension from pendant droplet goniometry as well as the concentration effect. The result shown is a summary of an analysis of variance where the p values for both liquid and differences in concentration are <0.001.

TABLE 1

Surface tension results of various example wetting compositions and reference compositions tested at different concentrations.

| Example No | Surfactant and proportion | Alcohol type and proportion | Polar Component type and proportion | Surface tension mN/m Concentration of wetting system | | |
|---|---|---|---|---|---|---|
| | | | | 0.1% | 0.5% | 1.0% |
| R1 | No surfactant | No alcohol | Water 100%[1] | 72.86 | | |
| R2 | 8NB 100%[2] | No alcohol[3] | 0% | 29.32 | 29.76 | 29.84 |
| R3 | P408[3] 100% | No alcohol | 0% | 20.53 | 20.36 | 20.19 |
| R4 | No surfactant | Dodecanol 100% | 0% | 68.1[4] | | |
| 1 | 8NB 45% | Decanol 45% | Water 10% | 28.74 | 24.91 | 24.54 |
| 2 | 8NB 45% | Decanol 22.5% Dodecanol 22.5% | Water 10% | 24.04 | 23.7 | 21.77 |
| 3 | 8NB 67.5% | Dodecanol 22.5% | Water 10% | 20.56 | 19.71 | 21.32 |
| 4 | 8NB 45% | Decanol 45% | Water 10% | 24.04 | 23.70 | 21.78 |
| 5 | 8NB 50% | C12:C14 (70:30)[4] 45% | Water 5% | 29.28 | 22.64 | 21.69 |
| 6 | 8NB 50% | Dodecanol 25% % | Ethanol 25% | 28.88 | 22.88 | 22.22 |
| CE1 | 8NB 50% | 1-octanol 50% | 0% | 28.23 | 24.77 | 24.5 |

Notes:
[1] Ultra-pure water.
[2] Teric BL8 (non-ionic) surfactant.
[3] Organosilicone surfactant identical to Silwet L-77.
[4] Provided by a commercial preparation Dodecanol Rezex DD having 70% dodecanol and 30% tetradecanol Results:

As seen in Table 1, the surface tension of ultra-pure water was about 72 mN/m at 20° C. Wetting compositions of the invention were able to significantly lower the surface tension of water to values of less than 24 mN/m at one or more of the concentrations tested.

Figure 2:
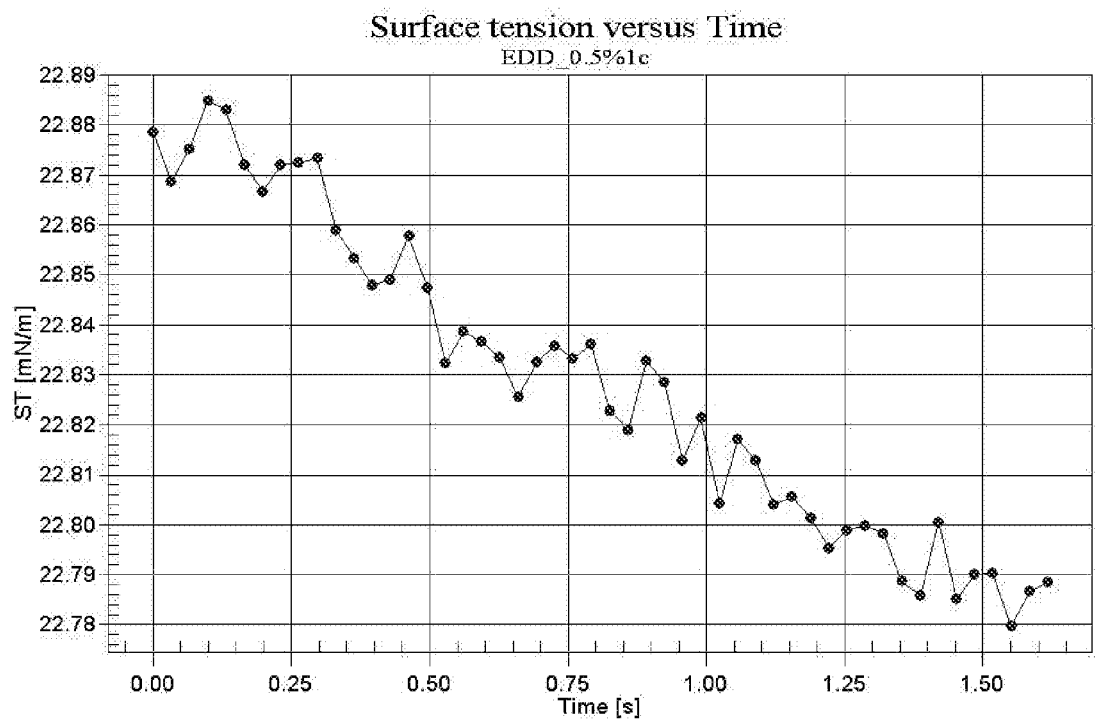
FIG. 2 is graph illustrating the change in surface tension (mN/m) over time (s) for an aqueous liquid comprising 0.5% of a wetting composition comprising 50% non-ionic surfactant, 25% dodecanol and 25% ethanol of one embodiment of the invention.
Figure 3:
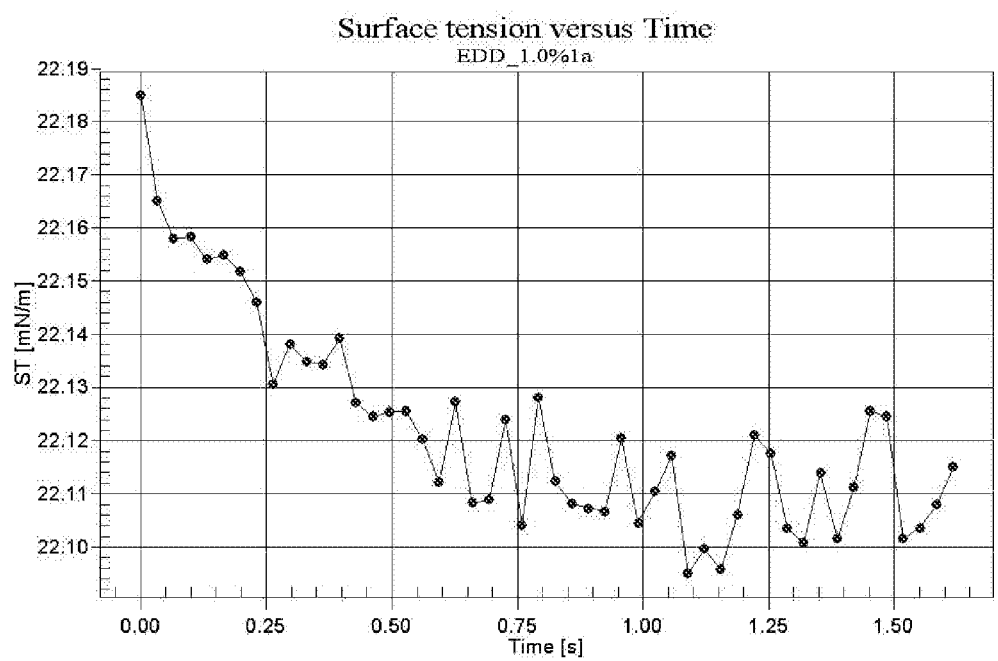
FIG. 3 is graph illustrating the change in surface tension (mN/m) over time (s) for an aqueous liquid comprising 1.0% of a wetting composition comprising 50% non-ionic surfactant, 25% dodecanol and 25% ethanol of one embodiment of the invention.

The effect of the wetting composition of Example 6 on the surface tension of water at different concentrations is also shown in FIGS. 1 to 3.

As seen in the Figures, when a wetting composition containing a non-ionic surfactant and dodecanol with ethanol in an amount of 25% was added to water, a reduction in surface tension of the water was achieved, with surface tension continuing to reduce over time.

Example 7: Compatibility of Wetting Compositions with Agricultural Compositions

The compatibility of wetting compositions of the invention with commercial herbicide concentrates is assessed.

The herbicidal compositions are diluted to a concentration of 1% (w/w) in water and the selected wetting composition is added to the following herbicidal composition at a concentration of 2% (w/w).

The herbicidal compositions tested were as follows:
Glyphosate 360 g/l (Roundup®)
MCPA (2-methyl-4-chlorophenoxyacetic acid) broad leaf herbicide
Grazon 300 g/L TRICLOPYR present as butoxyethyl ester 100 g/l
Picloram woody weed herbicide
BrushOff® (metsulfuron methyl powder), 600 g/kg woody weed herbicide, which is a wettable powder
2, 4D (2,4-dichlorophenoxyacetic acid) broad leaf herbicide Herbicidal mixtures containing the wetting compositions are stable Example 8: Compatibility of Wetting Compositions with Resin Compositions The compatibility of wetting compositions of the invention with melamine urea formaldehyde resin containing up to 65% solids in an aqueous solution is assessed.

A wetting composition in an amount of 2% (w/w) is added to the resin. The solids do not react with the wetting composition and the resin containing the wetting composition is in a stable emulsion.

Example 9: Compatibility of Wetting Compositions with Foliar Fertilizers

The compatibility of wetting compositions with liquid foliar fertilisers such as ammonium sulphate, dolomite and gypsum dispersions, copper salts, (calcium) and various nitrogen foliar fertilisers is tested. A fertiliser containing the wetting compositions is stable.

Example 10: Use of Wetting Composition in Particleboard Flooring

Flooring is made with the addition of 0.2% wetting composition to both the surface and core of the flooring, which is made on a single daylight particleboard press.

Many modifications will be apparent to those skilled in the art without departing from the scope of the present invention.

The claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A wetting agent suitable for addition to an aqueous liquid to reduce the surface tension of the aqueous liquid, said wetting agent being in the form of a liquid composition consisting of:
   (a) 20 to less than 50 wt % of one or more C10-C14 alcohol;
   (b) 25 to 70 wt % of one or more surfactant selected from a non-ionic, cationic, anionic and amphoteric surfactant;
   (c) 5 to 50 wt % of a polar component comprising at least one selected from (i) water, provided that the water is at most 10 wt % of the wetting agent, and (ii) a water-miscible C1-C3 organic solvent, provided that the water-miscible C1-C3 organic solvent is at most 25 wt % of the wetting agent; and
   (d) 0 to 10 wt % other additives;
   wherein the composition comprises a C12 alcohol and a C14 alcohol; and
   wherein the polar component comprises a water-miscible C1-C3 alcohol.

2. The wetting agent according to claim 1, wherein the composition comprises 20 to 45 wt % of one or more C10-C14 alcohol.

3. The wetting agent according to claim 1, wherein the relative proportion of C12 alcohol to C14 alcohol is in the range of from 50:50 to 90:10 by weight.

4. The wetting agent according to claim 1, wherein the surfactant is an alcohol alkoxylate.

5. The wetting agent according to claim 1, wherein the polar component comprises water, the water being present in the amount of 5 to 10 wt % of the wetting agent.

6. The wetting agent according to claim 1, wherein the water-miscible C1-C3 alcohol is ethanol.

7. The wetting agent according to claim 1, wherein the composition comprises from 0 to 5 wt % of one or more other additives.

8. The wetting agent of claim 1, wherein the wetting agent is in the form of a liquid composition consisting of:
   (a) 22 to less than 47 wt % of one or more C10-C14 alcohol;
   (b) 40 to 70 wt % of one or more surfactant selected from a non-ionic, cationic, anionic and amphoteric surfactant;
   (c) 5 to 25 wt % of a polar component comprising at least one selected from (i) water and (ii) a water-miscible C1-C3 organic solvent; and
   (d) 0 to 10 wt % other additives.

9. The wetting agent of claim 1, wherein:
   the one or more surfactant is a non-ionic surfactant; and
   the polar component is selected from the group consisting of water, a water-miscible C1-C3 organic solvent, and combinations thereof.

10. A method of lowering the surface tension of water, the method comprising the step of adding the wetting agent of claim 1 to the water, wherein the reduction of surface tension increases with the amount of wetting agent that is added.

11. A method of lowering the surface tension of an aqueous-based resin, the method comprising the step of adding the wetting agent of claim 1 to the aqueous-based resin, wherein the reduction of surface tension increases with the amount of wetting agent that is added.

12. A method of lowering the surface tension of an aqueous agricultural composition, the method comprising the step of adding the wetting agent of claim 1 to the aqueous agricultural composition, wherein the reduction of surface tension increases with the amount of wetting agent that is added.

13. A method of lowering the surface tension of an aqueous liquid, the method comprising the step of adding the wetting agent of claim 1 to the aqueous liquid, wherein the reduction of surface tension increases with the amount of wetting agent that is added.

14. A method of wetting a low energy surface with a relatively high surface energy liquid, the method comprising the step of:
   adding the wetting agent according to claim 1 to the relatively high surface energy liquid; and
   contacting the low energy surface with the relatively high surface energy liquid comprising the wetting agent.

* * * * *